US006410197B1

(12) United States Patent
Bellino et al.

(10) Patent No.: US 6,410,197 B1
(45) Date of Patent: *Jun. 25, 2002

(54) METHODS FOR TREATING ALUMINUM SUBSTRATES AND PRODUCTS THEREOF

(75) Inventors: Mark Thomas Bellino, Loveland; Jennifer Kaye Neely, Arvada; Catherine Mailhé Randolph, Niwot; Kasturi Rangan Srinivasan, Longmont, all of CO (US)

(73) Assignee: Lexmark International, Inc., Lexington, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,683

(22) Filed: Sep. 18, 1998

(51) Int. Cl.$^{7}$ .......................... G03G 5/047; G03G 5/10; B32B 15/04

(52) U.S. Cl. .......................... 430/65; 430/69; 430/59.1; 428/472.2

(58) Field of Search .......................... 430/57.1, 69, 64, 430/65, 127, 131, 59.1; 205/203, 204, 198; 148/275, 251, 279; 428/472.2

(56) References Cited

U.S. PATENT DOCUMENTS

| | | | | | |
|---|---|---|---|---|---|
| 3,418,218 | A | * | 12/1968 | Levy | 205/204 |
| 3,615,405 | A | * | 10/1971 | Shebanow | |
| 3,672,966 | A | | 6/1972 | Geisler et al. | |
| 4,483,751 | A | | 11/1984 | Murayama et al. | 204/37.1 |
| 4,782,000 | A | * | 11/1988 | Lauke et al. | 430/64 |
| 4,931,371 | A | * | 6/1990 | Matsumoto et al. | 430/66 |
| 5,173,384 | A | * | 12/1992 | Otsuka | 430/58.15 |
| 5,248,578 | A | * | 9/1993 | Takaoka et al. | 430/64 |
| 5,330,635 | A | | 7/1994 | Floyd, Jr. | 205/204 |
| 5,534,356 | A | | 7/1996 | Mahulikar et al. | 428/615 |
| 5,561,015 | A | | 10/1996 | Yoshida et al. | 430/62 |
| 5,561,016 | A | | 10/1996 | Suzuki et al. | 430/96 |
| 5,763,126 | A | * | 6/1998 | Miyauchi et al. | 430/96 |
| 5,875,375 | A | * | 2/1999 | Ohmori et al. | 430/69 |
| 5,925,486 | A | * | 7/1999 | Levin et al. | |

FOREIGN PATENT DOCUMENTS

| | | | | |
|---|---|---|---|---|
| EP | 0014035 | | 8/1980 | |
| EP | 0058023 | * | 8/1982 | 205/204 |
| GB | 1150812 | | 5/1969 | |
| GB | 1330955 | | 9/1973 | |
| GB | 1604317 | | 12/1981 | |
| JP | 63-296051 | * | 12/1988 | |
| JP | 2-293852 | * | 12/1990 | |
| JP | 6-289629 | * | 10/1994 | 430/96 |

OTHER PUBLICATIONS

Diamond, A.S. ed. *Handbook of Imaging Materials*, Marcel Dekker, Inc., NY (1991), p. 387.*

Paperchem2 Abstract 89:4807 of JP 63–296051, 1989.*

Japio Abstract 1988—296051 of JP 63–296051, Mar. 1989.*

Patent & Trade Office English–Language Translation of JP 6–289629 (Pub 10/94).*

ACS Complete File Registry RN 25068–38–6, 10 pages. (Copyright 2000 ACS).*

Patent & Trademark English–Language Translation of JP 2–293852 (Pub 12/1990).*

ACS File Registry RN 25 068–38–6.*

ACS File Registry RN 25322–68–3.*

English WPI (World Patent Index) Abstract and English PAJ (Patent Abstract of Japan) Abstract of Japanese Reference JP 4–349467 of Dec. 3, 1992.

English WPI (World Patent Index) Abstract and English PAJ (Patent Abstract of Japan) Abstract of Japanese Reference JP 9–90658 of Apr. 4, 1997.

* cited by examiner

*Primary Examiner*—Janis L. Dote
(74) *Attorney, Agent, or Firm*—John A. Brady

(57) ABSTRACT

Methods of forming a conductive aluminum substrate comprise anodizing a surface of an aluminum substrate to form a porous alumina surface layer, contacting the alumina surface layer with a liquid dispersion or solution of a polymer or at least one polymer-forming component, under conditions sufficient for the polymer to seal pores of the alumina surface layer, and removing excess polymer from the alumina surface layer. The resulting sealed conductive aluminum substrate is useful in photoconductors, for example of the dual layer type.

8 Claims, No Drawings

METHODS FOR TREATING ALUMINUM SUBSTRATES AND PRODUCTS THEREOF

FIELD OF THE INVENTION

The present invention is directed to methods for treating a conductive aluminum substrate and to aluminum substrates treated according to the present methods. The present invention is also directed to methods of forming photoconductors wherein the photoconductor aluminum substrate is treated in accordance with the aforementioned methods, and to photoconductors formed by such methods.

BACKGROUND OF THE INVENTION

Typically, photoconductors comprise a conductive substrate which is conventionally formed of aluminum. It is advantageous to anodize the surface of the conductive aluminum substrate in order to improve the toughness and handling ability of the substrate and to suppress specular reflections such as Moire patterns. In a typical anodization process, the raw aluminum substrate or core is first cleaned and deoxidized, and then a porous alumina/hydrated aluminum oxide layer is formed by electrolytic oxidation of the aluminum in an electrochemical cell. The alumina layer is highly porous as it generally comprises hexagonal columns separated by deep pores.

The porous alumina layer is usually sealed, i.e., the pores of the alumina are filled or closed, in order to improve the electrophotographic properties of the anodized substrate. Several different sealing processes are commonly used. One sealing process, referred to as the water sealing process, involves immersion of the porous alumina layer in boiling water to convert the alumina to a hydrated alumina phase. This conversion is accompanied by a volume increase which seals or plugs the pores. In another sealing process, a metallic salt, for example a salt of a heavy metal such as cobalt or nickel, is contacted with the alumina layer. The metal deposits, typically as a hydroxide, within the pores of the alumina layer to provide a sealing effect. However, the use of heavy metals such as cobalt or nickel is disadvantageous in that high waste disposal costs are incurred. Additionally, alumina surface layers sealed by either the water sealing or metal salt sealing processes exhibit less than optimal adhesion to overlying layers when the aluminum substrates are employed in photoconductors. Poor adhesion of photoconductive layers to an aluminum substrate can result in catastrophic delamination during printer operation and therefore an undesirably shortened useful life for the photoconductor.

In the past, barrier layers and/or sublayers have been employed between a photoconductor substrate and an adjacent charge generation layer or charge transport layer. However, the use of such layers is disadvantageous in that the barrier or sublayer must be applied by dip coating or another controlled process and therefore significantly increases both the production time and costs for the photoconductor.

Accordingly, a need exists for methods for more easily preparing aluminum substrates, for example for use in photoconductors and for photoconductor substrates, which exhibit improved adhesion to overlying photoconductive layers.

SUMMARY OF THE INVENTION

Accordingly, it is an object of the present invention to provide methods for treating conductive aluminum substrates. It is a more specific object of the present invention to provide methods for treating conductive aluminum substrates which are suitable for use in photoconductors. It is a further object of the invention to provide methods for treating aluminum photoconductor substrates to provide the substrates with good toughness and handling ability while overcoming disadvantages of prior art methods. It is a related object to provide conductive aluminum substrates which exhibit good adhesion to overlying layers when the substrates are employed as photoconductor substrates, while maintaining good performance of the photoconductors.

These and additional objects and advantages are provided by the methods, substrates and photoconductors of the present invention. According to the present invention, the methods for treating a conductive aluminum substrate comprise anodizing a surface of an aluminum substrate to form a porous alumina surface layer, contacting the alumina surface layer with a liquid dispersion or solution of a polymer or at least one polymer-forming component, under conditions sufficient for the polymer to seal pores of the alumina surface layer, and removing excess polymer from the alumina surface layer. Preferably, the excess polymer is removed from the alumina surface layer by rinsing. Optionally, the surface of the treated alumina layer may be dried. The polymer seals the pores of the alumina surface layer to allow good electrophotographic properties when the layer is employed as a photoconductor substrate and allows good adhesion of the substrate to overlying photoconductive layers, for example overlying charge generation layers and/or charge transport layers used to form photoconductors. Additionally, photoconductors which include conductive aluminum substrates treated according to the present methods exhibit good electrical characteristics and print quality and improved durability owing to the good adhesion of the photoconductive layers to the aluminum substrate.

These and additional objects and advantages provided by the methods, substrates and photoconductors of the present invention will be more fully understood in view of the following detailed description.

DETAILED DESCRIPTION

According to the present methods, the surface of a conductive aluminum substrate is anodized to form a porous alumina surface layer. Preferably, the surface is cleaned and deoxidized prior to the anodization. The alumina surface layer is then contacted with a liquid dispersion or solution of a polymer or at least one polymer-forming component under conditions sufficient for polymer to seal pores of the alumina surface layer. Excess polymer is then removed from the alumina surface layer, for example by rinsing the layer before the polymer dries thereon.

The conductive aluminum substrate is described herein as suitable for use as a substrate of a photoconductor. However, it will be apparent to those skilled in the art that the conductive aluminum substrate as disclosed herein may be employed in various other devices and embodiments. Typically, a photoconductor substrate is in the form of a drum, and comprises a thin surface layer of aluminum which functions as an electrical ground plane. The aluminum may be deposited on the drum by any suitable method, including, for example, by vacuum evaporation. Both aluminum and aluminum alloys may be employed. Various aluminum alloys are suitable for preparing photoconductive drum substrates, one example of which comprises the alloy 3003. The aluminum substrate will have a thickness adequate to provide the required mechanical stability for the photoconductor. Typically, drum substrates have a thickness of from about 0.75 mm to about 1 mm, although greater or smaller thicknesses are equally within the scope of this invention.

Processes for anodization of a surface of an aluminum substrate to form a porous alumina surface layer are known in the art and may be employed in the present methods. Preferably, the aluminum is first cleaned and deoxidized before anodization. To anodize the surface of the aluminum layer, the aluminum is subjected to electrolytic oxidation in an electrochemical cell. The electrolyte typically comprises an acidic component, for example an inorganic acid such as sulfuric acid, although many other acids may be employed in place of sulfuric acid in accordance with techniques known in the art. The alumina grows as hexagonal columns separated by deep pores resulting in an alumina layer which is highly porous. The anodization may be conducted to form an alumina layer of any desired thickness. When the aluminum substrate is to be employed as a photoconductor substrate, an alumina surface layer of up to about 10 microns, preferably up to about 5 microns, is preferred. Suitable cell operating conditions, including specific electrolyte composition and concentration, bath temperature, current density and duration, will be apparent to one of ordinary skill in the art and selected depending on the desired thickness of the alumina surface layer. The resulting alumina layer is advantageous in that it improves the toughness and handling ability of the aluminum substrate and substantially suppresses specular reflections such as Moire patterns.

However, because the alumina layer is porous, the pores must be filled or sealed to allow good electrophotographic properties when the alumina layer is employed as a photoconductor substrate. Conventional methods for sealing the alumina layer generally cause the substrate to exhibit relatively poor adhesion to overlying layers. Previous steps to improve adhesion of the substrate to overlying photoconductive layers have encountered various disadvantages, for example in increasing the processing time and costs and/or in providing substrates which disadvantageously effect photoconductor properties such as electrical performance and/or print quality. However, such disadvantages are overcome and good substrate adhesion is provided by the methods of the present invention wherein the anodized aluminum substrate containing an alumina surface layer is contacted with a liquid dispersion or solution of a polymer or at least one polymer-forming component under conditions sufficient for polymer to seal pores of the alumina surface layer. Although the present invention is not intended to be limited by theory, it is believed that the polymer is adsorbed into the alumina pores and thereby seals the pores of the alumina surface layer. Excess polymer is removed from the polymer surface layer, for example by rinsing, before the polymer dries thereon. It is believed that the adsorption of the polymer into the alumina pores is substantially irreversible in the absence of additional removal techniques, whereby the rinsing removes all polymer except that adsorbed and held in the pores by surface attraction.

Various polymers are suitable for use in the methods of the present invention. Additionally, polymer-forming components which form polymers in situ in the liquid dispersion may also be employed. As will be discussed in further detail below, phenoxy resins, epoxy resins and polyalkylene oxide polymers, for example polyethylene oxide, polypropylene oxide and the like, are particularly suitable for use in the present methods. Generally, epoxy resins are formed from an epoxy compound such as epichlorohydrin and contain epoxide groups before crosslinking. Commonly, epoxy resins are formed by condensing epichlorohydrin with bisphenol A, preferably using an excess of epichlorohydrin in order to ensure epoxide groups are contained at each end of the resulting polymer. Such epoxy resins are generally of the following formula:

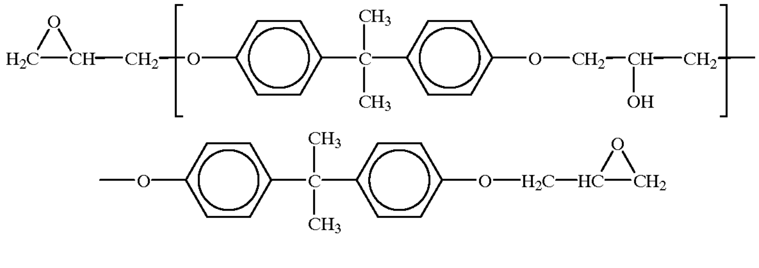

Epoxy resins suitable for use herein include, but are not limited to butadiene-acrylonitrile modified epoxy resins, urethane modified epoxy resins, epoxy modified novolac resins, and the like. Epoxy resins are particularly suitable for use in the treatment methods of the invention as they dry to a clear film on the alumina surface layer.

Similarly, phenoxy resins are well known in the art and are commercially available from various sources. Phenoxy resins are commonly formed from epichlorohydrin and bisphenol A, but do not contain epoxy groups. The phenoxy resins generally have a repeating unit of the following formula:

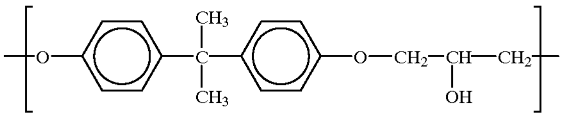

Naturally occurring polymers, for example pectin, are also suitable for use in the methods of the present invention. Pectin may be employed in its naturally occurring form or the pectin may be functionalized, for example with a silicon-containing organic compound, such as N-[3-triethoxysilylpropyl]-4,5-dihydroimidazole (TSPI).

Various polymer-forming components may also be employed in the liquid dispersion or solution to form in situ a polymer for sealing pores of the alumina. An example of such a polymer-forming component comprises TSPI, although other suitable components will be apparent to those skilled in the art. Within the scope of the present specification, reference to a liquid dispersion or solution of a polymer-forming component refers to a liquid dispersion or solution to which a polymer-forming component has been added, as those skilled in the art will recognize that upon addition of the polymer-forming component, in situ polymerization of the polymer-forming component or derivative thereof may proceed to such an extent that the added component may not exist in the solution in its original form.

In accordance with an important feature, the polymer or polymer-forming component or components are dispersed or dissolved in a liquid for contact with the alumina surface layer. The liquid may comprise water or a mixture of water and an organic liquid, or alternatively, may consist of one or more organic liquids. In a preferred embodiment, the alumina surface layer is contacted with an aqueous dispersion or solution of a polymer or at least one polymer-forming component. Surfactants or other additives may be added to the dispersion or solution as desired.

Suitably, the alumina surface layer may be contacted with the liquid dispersion or solution of polymer or polymer-forming component by immersing at least the alumina surface layer, and preferably the entire substrate, in the liquid dispersion or solution of the polymer or polymer-forming component. Immersion of the substrate facilitates this process step although other techniques, including spraying and the like may be employed as long as the application conditions are sufficient for the polymer to seal pores of the alumina surface layer. The present method is distinguishable from dip coating which has conventionally been employed to apply a barrier or sublayer to an aluminum substrate in that such conventional dip coating applications require that the substrate is removed from the coating bath at a controlled rate in order to form a uniform surface layer. To the contrary, in the present methods, the alumina surface layer does not require removal from the liquid dispersion or solution at a controlled rate. In fact, according to the present methods, excess polymer is removed from the alumina surface layer before the polymer dries on the surface layer.

The liquid dispersion or solution which is contacted with the alumina surface layer may be at any suitable temperature to facilitate sealing of the pores of the alumina by the polymer. Depending on the specific composition of the polymer, the liquid dispersion or solution may be at or below room temperature or alternatively may be at a temperature greater than room temperature, for example, greater than about 40° C. or even greater than about 50° C. Additionally, the concentration of the polymer or polymer-forming components in the liquid dispersion will be sufficient to allow the polymer to seal pores of the alumina surface layer. In a preferred embodiment, the liquid dispersion or solution contains greater than about 0.5 volume percent of the polymer of polymer-forming components and more preferably the liquid dispersion or solution contains from about 1 to about 10 volume percent of the polymer or polymer-forming components.

Typically, the alumina surface layer may be immersed in the liquid dispersion or solution for a period of time (the seal time) of at least about 30 seconds, and preferably greater than about one minute and less than about 60 minutes. More preferably, the seal time in which the alumina surface layer is contacted with the liquid dispersion or solution is in the range of from about three to about 10 minutes in order to obtain sufficient sealing of the porous alumina by the polymer.

Preferably, the excess polymer is removed from the alumina surface layer by rinsing, and more preferably by rinsing with an aqueous rinse liquid. The aqueous rinse liquid may be water only, or may be a combination of water and one or more organic rinse liquids. Alternatively, the excess polymer may be removed by rinsing with one or more organic rinse liquids, in the absence of water. Water is the preferred rinsing liquid. Other techniques for removing excess polymer from the alumina surface layer while maintaining the polymer which seals the pores of the alumina surface layer thereon, will be apparent to those skilled in the art.

The rinse liquid which is employed to remove excess polymer may be at any suitable temperature. In a preferred embodiment, the rinse liquid is at room temperature or a temperature greater than room temperature. As will be discussed in further detail in the examples set forth below, rinse temperatures greater than room temperature are particularly advantageous for use with certain polymers. Rinse liquid temperatures greater than about 50° C., and even up to boiling temperatures, may be particularly preferred. If desirable, both a cold rinse (for example at room temperature) and a hot rinse at an elevated temperature may be employed to remove excess polymer. After rinsing, the aluminum substrate may be dried in order to expedite processing.

The aluminum substrates which are produced according to the present methods comprise an anodized surface layer of porous alumina and a polymer which seals the pores of the alumina surface layer. Since excess polymer is removed from the alumina surface layer, a polymer coating typically does not extend above the anodized alumina layer of the substrate. Accordingly, the thickness of any coating of the polymer which extends above the anodized alumina layer is not substantial and typically less than about 1 micron.

The substrates are particularly suitable for use as photoconductor substrates in accordance with well known photoconductor technology. In a preferred embodiment, a substrate treated according to the methods of the present invention serves as a substrate for a dual layer photoconductor which comprises a substrate, a charge transport layer and a charge generation layer.

In a preferred embodiment, the charge generation layer may be formed on the photoconductor substrate formed according to the present methods, followed by formation of the charge transport layer containing a hole transport compound, whereby a negative charge may be placed on the photoconductor surface. Conversely, the charge transport layer containing a hole transport compound may be formed on the photoconductor substrate and the charge generation layer is in turn formed on the charge transport layer, whereby a positive charge may be placed on the photoconductor surface. As one skilled in the art will appreciate, if the charge transport layer contains an electron transport material, the charges which may be placed on the photoconductor surface as a result of the arrangement of the charge transport and charge generation layers will be reversed.

The charge transport layer included in the dual layer photoconductors typically comprises binder and a charge transport compound. The charge transport layer is in accordance with conventional practices in the art and therefore may include any binder and any charge transport compound generally known in the art for use in charge transport layers. Typically, the binder is polymeric and may comprise, but is not limited to, vinyl polymers such as polyvinyl chloride, polyvinyl butyral, polyvinyl acetate, styrene polymers, and copolymers of these vinyl polymers, acrylic acid and acrylate polymers and copolymers, polycarbonate polymers and copolymers, including polyestercarbonates, polyesters, alkyd resins, polyamides, polyurethanes, epoxy resins and the like.

Conventional charge transport compounds suitable for use in the charge transport layer of the photoconductors of the present invention should be capable of supporting the injection of photo-generated holes or electrons from the charge generation layer and allowing the transport of these holes or electrons through the charge transport layer to selectively discharge the surface charge. Suitable charge transport compounds for use in the charge transport layer include, but are not limited to, the following:

1. Diamine and triarylamine transport molecules of the types described in U.S. Pat. Nos. 4,306,008, 4,304,829, 4,233,384, 4,115,116, 4,299,897, 4,265,990 and/or 4,081,274. Typical diamine transport molecules include N,N'-diphenyl-N,N'-bis(alkylphenyl)-[1,1'-biphenyl]-4,4'-diamines wherein the alkyl is, for example, methyl, ethyl, propyl, n-butyl, or the like, or halogen substituted derivatives thereof, commonly referred to as benzidine and substituted benzidine compounds, and the like. Typical triarylamines include, for example, tritolylamine, and the like.

2. Pyrazoline transport molecules as disclosed in U.S. Pat. Nos. 4,315,982, 4,278,746 and 3,837,851. Typical pyrazoline transport molecules include 1-[lepidyl-(2)]-3-(p-diethylaminophenyl)-5-(p-diethylaminophenyl)pyrazoline, 1-[quinolyl-(2)]-3-(p-diethylaminophenyl)-5-(p-diethylaminophenyl)pyrazoline, 1-[pyridyl-(2)]-3-(1-diethylaminostyryl)-5-(p-diethylaminophenyl)pyrazoline, 1-[6-methoxypyridyl-(2)]-3-(-diethylaminostyryl)-5-(p-diethylaminophenyl) pyrazoline, 1-phenyl-3-[-p-diethylaminostyryl]-5-(p-dimethylaminostyryl)pyrazoline, 1-phenyl-3-[p-diethylaminostyryl]-5-(p-diethylaminostyryl) pyrazoline, and the like.

3. Substituted fluorene charge transport molecules as described in U.S. Pat. No. 4,245,021. Typical fluorene charge transport molecules include 9-(4'-dimethylaminobenzylidene)fluorene, 9-(4'-methoxybenzylidene)fluorene, 9-(2,4'-dimethoxybenzylidene)fluorene, 2-nitro-9-benzylidene-fluorene, 2-nitro-9-(4'-diethylaminobenzylidene)fluorene and the like.

4. Oxadiazole transport molecules such as 2,5-bis(4-diethylaminophenyl)-1,3,4-oxadiazole, imidazole, triazole, and others as described in German Patents Nos. 1,058,836, 1,060,260 and 1,120,875 and U.S. Pat. No. 3,895,944.

5. Hydrazone transport molecules including p-diethylaminobenzaldehyde-(diphenylhydrazone), p-diphenylaminobenzaldehyde-(diphenylhydrazone), o-ethoxy-p-diethylaminobenzaldehyde-(diphenylhydrazone), o-methyl-p-diethylaminobenzaldehyde-(diphenylhydrazone), o-methyl-p-dimethylaminobenzaldehyde(diphenylhydrazone), p-dipropylaminobenzaldehyde-(diphenylhydrazone), p-diethylaminobenzaldehyde-(benzylphenylhydrazone), p-dibutylaminobenzaldehyde-(diphenylhydrazone), p-dimethylaminobenzaldehyde-(diphenylhydrazone) and the like described, for example, in U.S. Pat. No. 4,150,987. Other hydrazone transport molecules include compounds such as 1-naphthalenecarbaldehyde 1-methyl-1-phenylhydrazone, 1-naphthalenecarbaldehyde 1,1-phenylhydrazone, 4-methoxynaphthlene-1-carbaldehyde 1-methyl-1-phenylhydrazone and other hydrazone transport molecules described, for example, in U.S. Pat. Nos. 4,385,106, 4,338,388, 4,387,147, 4,399,208 and 4,399,207. Yet other hydrazone charge transport molecules include carbazole phenyl hydrazones such a 9-methylcarbazole-3-carbaldehyde-1,1-diphenylhydrazone, 9-ethylcarbazole-3-carbaldehyde-1-methyl-1-phenylhydrazone, 9-ethylcarbazole-3-carbaldehyde-1-ethyl-1-phenylhydrazone, 9-ethylcarbazole-3-carbaldehyde-1-ethyl-1-benzyl-1-phenylhydrazone, 9-ethylcarbazole-3-carbaldehyde-1,1-diphenylhydrazone, and other suitable carbazole phenyl hydrazone transport molecules described, for example, in U.S. Pat. No. 4,256,821. Similar hydrazone transport molecules are described, for example, in U.S. Pat. No. 4,297,426. Preferred hydrazone transport molecules include derivatives of aminobenzaldehydes, cinnamic esters or hydroxylated benzaldehydes. Exemplary amino benzaldehyde-derived hydrazones include those set forth in the Anderson et al U.S. Pat. Nos. 4,150,987 and 4,362,798, while exemplary cinnamic ester-derived hydrazones and hydroxylated benzaldehyde-derived hydrazones are set forth in the copending Levin et al U.S. applications Ser. Nos. 08/988,600, now abandonded, and 08/988,791, now U.S. Pat. No. 5,925, 486, respectively, all of which patents and applications are incorporated herein by reference.

The charge transport layer typically comprises the charge transport compound in an amount of from about 5 to about 60 weight percent, based on the weight of the charge transport layer, and more preferably in an amount of from about 15 to about 40 weight percent, based on the weight of the charge transport layer, with the remainder of the charge transport layer comprising the binder, and any conventional additives.

The charge generation layer typically comprises binder and a charge generation compound. The polymeric binder of the charge generation layer may be any polymeric binder known in the art for use in charge generation layers, including any of the binders noted above for use in the charge transport layer. Various charge generation compounds which are known in the art are suitable for use in the charge generation layer of the photoconductors according to the present invention. Organic charge generation compounds are suitable for use in the present photoconductors, examples of which include, but are not limited to, disazo compounds, for example as disclosed in the Ishikawa et al U.S. Pat. No. 4,413,045, tris-azo and tetrakis-azo compounds as known in the art, phthalocyanine dyes, including both metal-free forms such as X-form metal-free phthalocyanines and the metal-containing phthalocyanines such as titanium-containing phthalocyanines as disclosed in U.S. Pat. Nos. 4,664,997, 4,725,519 and 4,777,251, polymorphs and derivatives thereof, and squaric acid-derived dyes, for example hydroxy-squaraine charge generation compounds. Both metal-free forms and metal-containing forms of the phthalocyanines are preferred. A preferred charge generation compound for use in the charge generation layer according to the present invention comprises metal-containing phthalocyanines, and more particularly metal-containing phthalocyanines wherein the metal is a transition metal or a group IIIA metal. Of these metal-containing phthalocyanine charge generation compounds, those containing a transition metal such as copper, titanium or manganese or containing aluminum as a group IIIA metal are preferred. The metal-containing phthalocyanine charge generation compound optionally may be oxy, thiol or dihalo substituted. Oxo-titanyl phthalocyanines are especially preferred, including various polymorphs thereof, for example type IV polymorphs, and derivatives thereof, for example halogen-substituted derivatives such as chlorotitanyl phthalocyanines.

The charge generation compounds are employed in the charge generation layer in conventional amounts suitable for providing the charge generation effects. Suitably, the charge generation layer comprises at least about 5 weight percent, based on the weight of the charge generation layer, of the charge generation compound, and preferably at least about 10 weight percent, based on the weight of the charge generation layer. In further preferred embodiments, the charge generation layer comprises at least about 15 weight percent of the charge generation compound and preferably from about 15 to about 50 weight percent of the charge generation compound, based on the weight of the charge generation layer, with the balance comprising binder and optionally, conventional additives.

The charge generation and charge transport layers may be formed on the photoconductor substrate according to the present invention in accordance with customary techniques in the art. Typically, the respective charge generation layer and charge transport layer are formed by dispersing and/or dissolving the respective charge generation compound and charge transport compound in a polymeric binder and solvent, coating the dispersion and/or solution on the respective underlying layer, and drying the coating. The charge generation layer will typically have a thickness of about 0.05 to about 5.0 microns while the charge transport layer will typically have a thickness of from about 10 to about 40 microns.

EXAMPLES

The methods, substrates and photoconductors according to the present invention are further described in the following examples wherein parts and percentages are by weight unless otherwise specified. In the examples, aluminum substrates were treated according to the present invention using the following general procedure. Initially, the aluminum drum substrates were cleaned by immersing the substrate in a conventional aqueous cleaning solution of basic pH in accordance with conventional techniques. The cleaning solution was heated to a temperature of from about 60° C. to about 70° C. The substrates were immersed in the cleaning solution for a period of from about 1 to about 10 minutes, preferably for about 5 minutes. The substrate was removed from the aqueous cleaning solution and rinsed with water. The substrate was then deoxidized in accordance with conventional techniques. Specifically, the aluminum substrate was immersed in an aqueous deoxidizing solution of acidic pH at room temperature. The substrate was immersed in the deoxidizing solution for a period of from about 1 to about 10 minutes, suitably from about 1 to about 5 minutes, and then removed from the deoxidizing solution and rinsed with water. The cleaned and deoxidized substrate was then subjected to anodization in accordance with conventional techniques. An electrolyte comprising a sulfuric acid solution was provided at about room temperature and the anodization was conducted using a current density of from about 1 to about 50 $mA/cm^2$, suitably from about 10 to about 30 $mA/cm^2$, for a period of from about 5 to about 25 minutes, suitably from about 10 to about 20 minutes. The anodization was controlled in order to form an alumina surface layer having a thickness of about 5 microns.

The sealing step in accordance with the present invention was conducted by immersing the anodized substrate in an aqueous polymeric dispersion or solution of a selected polymer as set forth in further detail below in the individual examples. The aqueous dispersion or solution was either at about room temperature (25° C.) or was heated to about 60° C. as described in the specific embodiments of the examples below. The concentration of the respective polymer in the aqueous dispersion or solution comprised about 0.5%, about 1% or about 2%, by volume, of the aqueous dispersion or solution, as is also further described in the individual examples set forth below. The anodized substrate was immersed in the aqueous polymeric dispersion or solution for a period of from about 3 to about 10 minutes as described in the individual examples. Excess polymer was removed from the substrate by rinsing with water as also described in the respective examples below. After rinsing, the substrates were dried and used to prepare photoconductors.

In the photoconductor preparation of the following examples, the aluminum drum s treated in accordance with the methods as described above were optionally rinsed with tetrahydrofuran as described in the individual examples. The drums were brushed and washed in accordance with conventional techniques. A charge generation layer comprising 45 weight percent titanyl phthalocyanine pigment, Y form, and 55 weight percent binder comprising polyvinylbutyral, supplied by Sekisui Chemicals under the designation BX-55Z, was formed on the substrate. A charge transport layer comprising 30 weight percent benzidine (N,N'-bis(3-methyl phenyl)-4,4'-biphenyldiamine) charge transport compound and 70 weight percent binder comprising a bisphenol-A polycarbonate supplied under the designation Makrolon-5208 by Bayer, was formed on the charge generation layer.

Example 1

In this example, photoconductors 1A, 1B and 1C were prepared according to the procedures described above and included aluminum substrates treated in accordance with the present invention and the procedures set forth above. The substrates of photoconductors 1A–1C were treated using aqueous dispersions comprising 0.5%, 1% and 2%, by volume, respectively, of a phenoxy resin commercially available under the designation PAPHEN™PKHW-35 from Phenoxy Associates, Rockhill, S.C. The liquid dispersion used to treat the alumina surface layers of the substrates of photoconductors 1A–1C was at about room temperature and the seal time was about 10 minutes. The treated substrates were rinsed with tetrahydrofuran and then brushed and washed in a conventional manner prior to coating with the photoconductor layers.

For comparison purposes, comparative photoconductors 1D–1G were prepared using comparative aluminum substrates. The aluminum substrate of comparative photoconductor 1D was a conventional anodized aluminum substrate sealed using a nickel acetate salt in accordance with conventional techniques. Comparative photoconductors 1E–1G each contained an aluminum substrate sealed with a nickel acetate salt in accordance with conventional techniques and similar to the substrate of photoconductor 1D, with the substrates of photoconductors 1E–1G having thereafter been "primed" by immersion in the aqueous phenoxy resin dispersions comprising 0.5%, 1% and 2%, by volume, respectively, of the phenoxy resin. Comparative photoconductors 1E–1G were "primed" in this manner in order to determine if immersion of conventionally sealed substrates in the aqueous polymer dispersion would provide the adhesion improvements obtained by the methods according to the present invention.

The adhesion characteristics of the respective photoconductors were evaluated using a tape test. Specifically, each photoconductor was exposed to high temperature/high humidity conditions of 78° F. and 80% relative humidity for a 24-hour period and then scored with a razor blade. Tape was applied and rapidly removed to determine the quality of adhesion of the photoconductive layers to the underlying aluminum substrate. Adhesion was rated on a scale of 0 to 5, with a 0 rating representing excellent adhesion evidenced by no photoconductor coating present on the removed tape and 5 representing very poor adhesion evidenced by complete delamination of the photoconductor coating from the drum substrate when the tape was removed.

The photoconductors were also subjected to measurement of electrical characteristics according to several different methods. Sensitivity measurements were made using an electrostatic sensitometer fitted with electrostatic probes to measure residual voltage and voltage magnitude as a function of light energy shining on the photoconductor surface. The photoconductors were charged by a corona and an expose-to-develop time of 257 ms was employed. The photosensitivity was measured as the discharge voltage on the photoconductor drum charged to an initial charge voltage, measured at a light energy of 0.237 microjoules/$cm^2$. Finally, the dark decay, i.e., the loss of charge from the surface of the photoconductor when it is maintained in the dark, was also measured. Dark decay is an undesirable feature as it reduces the contrast potential between image and background areas, leading to washed out images and loss of gray scale. Dark decay also reduces the field that the photoconductor process will experience when light is brought back to the surface, thereby reducing the operational efficiency of the photoconductor.

The results of these various measurements are set forth in Table 1.

does not merely provide a priming effect similar to conventional barrier or primer layers.

The results set forth in Table 1 further demonstrate that the photoconductors 1A–1C including aluminum substrates according to the present invention exhibited good electrical characteristics, and particularly photoconductors 1B and 1C exhibited electrical characteristics substantially equivalent to those of the comparative photoconductors. Thus, the methods according to the present invention may be used to prepare aluminum substrates which will exhibit improved adhesion to overlying photoconductive layers without disadvantageously influencing electrical characteristics of the photoconductors.

Example 2

In this example, additional photoconductors 2A–2J were prepared according to the present invention including aluminum substrates treated in accordance with the present methods and using aqueous dispersions of the phenoxy resin (1 percent by volume) described in Example 1. The temperature of the liquid dispersion of phenoxy resin polymer was varied between room temperature and 60° C. during treatment of the aluminum substrate as set forth in Table 2, using a seal time of 10 minutes. Additionally, the rinsing step

TABLE 1

| Photo-conductor | Phenoxy Resin in Dispersion (vol. %) | Sealed (invention) or Primed (comparative) | Adhesion Tape Test | Initial Charge Voltage (-V) | Residual Charge Voltage (-V) | Voltage at .237 $\mu J/cm^2$ (-V) | Dark Decay V/sec (1 sec) |
|---|---|---|---|---|---|---|---|
| 1A | 0.5% | sealed | 0 | 660 | 80 | 147 | 107 |
| 1B | 1% | sealed | 0 | 666 | 76 | 155 | 29 |
| 1C | 2% | sealed | 0 | 672 | 76 | 161 | 43 |
| 1D | 0% | NA | 4 | 689 | 88 | 130 | 12 |
| 1E | 0.5% | primed | 4 | 664 | 57 | 133 | 23 |
| 1F | 1% | primed | 2 | 666 | 55 | 133 | 18 |
| 1G | 2% | primed | 4 | 668 | 55 | 136 | 21 |

The results set forth in Table 1 demonstrate that photoconductors 1A–1C including an aluminum substrate treated according to the present invention, i.e., sealed with a liquid dispersion or solution of a polymer, exhibited excellent adhesion of the photoconductive layers to the substrate. To the contrary, each of comparative photoconductors 1D–1G exhibited inferior adhesion of the photoconductor layers to the respective aluminum substrates. Particularly, a comparison of photoconductors 1A–1C with photoconductors 1E–1G, respectively, demonstrates that the aluminum substrate treatment methods according to the present invention provide a unique sealing effect, believed to be provided by the irreversible adsorption of the polymer within the pores of the anodized layer, thereby sealing the anodized layer, and during treatment of the aluminum substrate was varied between a cold rinse at room temperature and/or a hot rinse at about 65° C., as further set forth in Table 2. The treated substrates were brushed and washed in a conventional manner, without the tetrahydrofuran rinse step, followed by coating with the photoconductive layers. Photoconductor 2K was prepared for comparative purposes using a substrate which was sealed in a conventional manner with a nickel acetate salt and which was not subjected to any treatment with a liquid dispersion of the phenoxy polymer.

The photoconductors of this example were subjected to measurement of adhesion, residual charge voltage, sensitivity and dark decay generally in accordance with the procedures set forth in Example 1. The results of these measurements are set forth in Table 2.

TABLE 2

| Photo-conductor | Temp of Dispersion (° C.) | Cold (RT) Rinse (min) | Hot (65° C.) Rinse (min) | Adhesion | Residual Charge Voltage (-V) | Voltage at .237 μJ/cm2 (-V) | Dark Decay V/sec (1 sec) |
|---|---|---|---|---|---|---|---|
| 2A | RT* | 1 | 2 | 0 | 95 | 170 | 40 |
| 2B | RT | 0 | 2 | 0 | 93 | 170 | 28 |
| 2C | RT | 1 | 10 | 0 | 83 | 158 | 22 |
| 2D | RT | 0 | 10 | 0 | 90 | 167 | 27 |
| 2E | RT | 0 | 0 | 0 | 92 | 174 | 40 |
| 2F | 60 | 1 | 2 | 0 | 96 | 178 | 25 |
| 2G | 60 | 0 | 2 | 0 | 90 | 168 | 27 |
| 2H | 60 | 1 | 10 | 0 | 94 | 168 | 29 |

TABLE 2-continued

| Photo-conductor | Temp of Dispersion (° C.) | Cold (RT) Rinse (min) | Hot (65° C.) Rinse (min) | Adhesion | Residual Charge Voltage (-V) | Voltage at .237 μJ/cm2 (-V) | Dark Decay V/sec (1 sec) |
|---|---|---|---|---|---|---|---|
| 2I | 60 | 0 | 10 | 0 | 86 | 155 | 27 |
| 2J | 60 | 0 | 0 | 0 | 94 | 160 | 28 |
| 2K | control | NA | NA | 4 | 93 | 173 | 22 |

*Room Temperature

The results set forth in Table 2 demonstrate that all of photoconductors 2A–2J according to the invention exhibited excellent adhesion of the photoconductive layers to the treated aluminum substrate. To the contrary, comparative photoconductor 2K containing the conventional nickel acetate sealed substrate exhibited relatively poor adhesion of the photoconductive layers to the substrate. The results set forth in Table 2 also demonstrate that photoconductors 2A–2J exhibited good electrical characteristics. Neither the temperature of the liquid dispersion of phenoxy resin nor the temperature and duration of the rinsing step significantly influenced the electrical characteristics of the photoconductors 2A–2J according to the present invention.

The print qualities of various photoconductors of this Example and additional photoconductors prepared in accordance with the procedures of this Example as set forth in Tables 3–5 were measured. Print quality was measured at operation under ambient environmental conditions, the results of which are set forth in Table 3, under conditions of 60° F. and 8% relative humidity, the results of which are set forth in Table 4, and under conditions of 78° F. and 80% relative humidity, the results of which are set forth in Table 5. For comparison, the print quality for a control photoconductor 2P which included a substrate prepared using a combination of conventional nickel acetate and water sealing was also measured. The Background (Bkgrnd) measurement measures stray toner on a white page, so that low Background values are desired. The Background was measured as the difference in reflectance of the white page before and after printing, measured using a Gardner refractometer. The Isopel OD (optical density) measurement evaluates the grey scale. A grey page is produced by printing a specific pattern of pels, with some pels on and some pels off. Each gray level corresponds to a particular energy in the V vs. E curve (calculated energy), and the Isopel values set forth in the following tables correspond to an energy level in the "knee" of the V vs. E curve.

TABLE 3

Ambient Environment

| Photocon-ductor | Liquid Dispersion Temp (° C.) | Cold (RT) Rinse (min.) | Hot (65° C.) Rinse (min.) | Bkgrnd | Isopel OD |
|---|---|---|---|---|---|
| 2A | Room | 1 | 2 | 0.86 | 0.4 |
| 2L | Room | 1 | 5 | 0.91 | 0.4 |
| 2M | Room | 0 | 5 | 0.72 | 0.37 |
| 2D | Room | 0 | 10 | 0.75 | 0.39 |
| 2B | Room | 0 | 2 | 0.76 | 0.36 |
| 2C | Room | 1 | 10 | 0.99 | 0.4 |
| 2F | 60 | 1 | 2 | 1.02 | 0.38 |
| 2G | 60 | 0 | 2 | 0.99 | 0.38 |
| 2N | 60 | 1 | 5 | 1.1 | 0.4 |
| 2O | 60 | 0 | 5 | 0.97 | 0.37 |
| 2H | 60 | 1 | 10 | 0.82 | 0.39 |

TABLE 3-continued

Ambient Environment

| Photocon-ductor | Liquid Dispersion Temp (° C.) | Cold (RT) Rinse (min.) | Hot (65° C.) Rinse (min.) | Bkgrnd | Isopel OD |
|---|---|---|---|---|---|
| 2I | 60 | 0 | 10 | 1.06 | 0.41 |
| 2P | Control | NA | NA | 0.87 | 0.38 |

TABLE 4

60° F. and 8% RH Environment

| Photocon-ductor | Liquid Dispersion Temp (° C.) | Cold (RT) Rinse (min.) | Hot (65° C.) Rinse (min.) | Bkgrnd | Isopel OD |
|---|---|---|---|---|---|
| 2A | Room | 1 | 2 | 0.36 | 0.25 |
| 2L | Room | 1 | 5 | 0.38 | 0.24 |
| 2M | Room | 0 | 5 | 0.42 | 0.24 |
| 2D | Room | 0 | 10 | 0.39 | 0.25 |
| 2B | Room | 0 | 2 | 0.41 | 0.24 |
| 2C | Room | 1 | 10 | 0.41 | 0.26 |
| 2F | 60 | 1 | 2 | 0.39 | 0.26 |
| 2G | 60 | 0 | 2 | 0.42 | 0.25 |
| 2N | 60 | 1 | 5 | 0.42 | 0.25 |
| 2O | 60 | 0 | 5 | 0.4 | 0.24 |
| 2H | 60 | 1 | 10 | 0.36 | 0.24 |
| 2I | 60 | 0 | 10 | 0.35 | 0.25 |
| 2P | Control | NA | NA | 0.38 | 0.23 |

TABLE 5

78° F. and 80% RH Environment

| Photocon-ductor | Liquid Dispersion Temp (° C.) | Cold (RT) Rinse (min.) | Hot (65° C.) Rinse (min.) | Bkgrnd | Isopel OD |
|---|---|---|---|---|---|
| 2A | Room | 1 | 2 | 0.36 | 0.25 |
| 2L | Room | 1 | 5 | 0.38 | 0.24 |
| 2M | Room | 0 | 5 | 0.42 | 0.24 |
| 2D | Room | 0 | 10 | 0.39 | 0.25 |
| 2B | Room | 0 | 2 | 0.41 | 0.24 |
| 2C | Room | 1 | 10 | 0.41 | 0.26 |
| 2F | 60 | 1 | 2 | 0.39 | 0.26 |
| 2G | 60 | 0 | 2 | 0.42 | 0.25 |
| 2N | 60 | 1 | 5 | 0.42 | 0.25 |
| 2O | 60 | 0 | 5 | 0.4 | 0.24 |
| 2H | 60 | 1 | 10 | 0.36 | 0.24 |
| 2I | 60 | 0 | 10 | 0.35 | 0.25 |
| 2P | Control | NA | NA | 0.38 | 0.23 |

The results set forth in Tables 3, 4 and 5 demonstrate that the photoconductors 2A–2D, 2F–2I and 2L–2O according to the present invention provided equivalent print quality results as compared with the photoconductor 2P containing the conventional substrate. Thus, photoconductors prepared according to the present invention are advantageous in resisting delamination of the photoconductor layers from the aluminum substrate without sacrificing electrical characteristics or print quality.

Example 3

In this Example, photoconductors 3A–3P were prepared according to the present invention including aluminum substrates sealed using aqueous dispersions of epoxy resins. The epoxy resins employed in the liquid dispersions for treating the photoconductor substrates according to the present invention comprised EPI-REZ resins supplied by Shell Chemical Company, specifically comprising a bisphenol A epoxy resin supplied under the designation 3515-W-60 (EP-1), a urethane-modified epoxy resin supplied under the designation 5520-W-60 (EP-2), a butadiene-acrylonitrile-modified epoxy resin supplied under the designation 3519-W-50 (EP-3), and an epoxidized bisphenol A novalac resin supplied under the designation 5003-W-55 (EP-4). The liquid dispersions contained the respective epoxy resins in an amount of 1% by volume. Photoconductors 3Q and 3R according to the invention were also prepared using a substrate treated with an aqueous dispersion of the phenoxy resin (1% by volume) described in Example 1. The particular polymer included in the liquid dispersion, the seal time, i.e., the liquid dispersion contact time with the anodized substrate, and the rinsing temperatures and times for the substrate employed in each inventive photoconductors of this example are set forth in Table 3. The treated substrates were rinsed with tetrahydrofuran, brushed and washed in a conventional manner, followed by coating with the photoconductor layers.

For comparison purposes, comparative photoconductors 3S–3V were also prepared. Photoconductors 3S and 3T comprised conventional nickel acetate salt sealed aluminum substrates while photoconductors 3U and 3V comprised substrates having a combination of nickel acetate and water sealing. The photoconductors of this example were subjected to measurement of adhesion, residual voltage, electrical sensitivity and dark decay in accordance with the procedures set forth in Example 1. The results of these various measurements are set forth in Table 6.

TABLE 6

| Photo-conductor | Sealant | Seal Time (min.) | Cold (RT) Rinse (min.) | Hot (74° C.) Rinse (min.) | Adhesion | Residual Voltage (-V) | Voltage at .23 $\mu J/cm^2$ | Dark Decay V/sec (1 sec) |
|---|---|---|---|---|---|---|---|---|
| 3A | EP-1 | 3 | 1 | 5 | 0 | 87 | 145 | 19 |
| 3B | EP-1 | 10 | 1 | 0 | | 107 | 177 | 247 |
| 3C | EP-1 | 10 | 1 | 5 | 0 | 71 | 162 | 21 |
| 3D | EP-1 | 10 | 0 | 0 | | 128 | 187 | 277 |
| 3E | EP-2 | 3 | 1 | 5 | 0 | 86 | 130 | 21 |
| 3F | EP-2 | 10 | 1 | 0 | | 134 | 194 | 298 |
| 3G | EP-2 | 10 | 1 | 5 | 0 | 67 | 153 | 31 |
| 3H | EP-2 | 10 | 0 | 0 | | 128 | 195 | 287 |
| 3I | EP-3 | 3 | 1 | 5 | 0 | 83 | 130 | 23 |
| 3J | EP-3 | 10 | 1 | 0 | | 127 | 190 | 279 |
| 3K | EP-3 | 10 | 1 | 5 | 0 | 68 | 150 | 28 |
| 3L | EP-3 | 10 | 0 | 0 | | 133 | 187 | 395 |
| 3M | EP-4 | 3 | 1 | 5 | 0 | 87 | 135 | 24 |
| 3N | EP-4 | 10 | 1 | 0 | | 132 | 178 | 371 |
| 3O | EP-4 | 10 | 1 | 5 | 0 | 71 | 143 | 26 |
| 3P | EP-4 | 10 | 0 | 0 | | 140 | 182 | 335 |
| 3Q | Phenoxy | 3 | 1 | 5 | 0 | 90 | 135 | 29 |
| 3R | Phenoxy | 10 | 1 | 5 | 0 | 77 | 151 | 31 |
| 3S | Ni acetate | NA | NA | NA | | 63 | 123 | 14 |
| 3T | Ni acetate | NA | NA | NA | 5 | 62 | 126 | 13 |
| 3U | Ni acetate/ water | NA | NA | NA | | 65 | 145 | 22 |
| 3V | Ni acetate/ water | NA | NA | NA | 3 | 68 | 136 | 8 |

The results set forth in Table 6 demonstrate that the photoconductors 3A–3R according to the present invention exhibited excellent adhesion of the photoconductive layers to the aluminum substrate. To the contrary, the photoconductors 3S–3V prepared from the nickel acetate salt sealed substrate and the nickel acetate salt-water sealed substrate exhibited inferior adhesion properties. Additionally, the results set forth in Table 6 further demonstrate that photoconductors including substrates which were treated using a hot rinse after contact with the liquid dispersion of polymer exhibited good electrical sensitivities and dark decay properties which were equivalent to those of the comparative photoconductors 3S–3V.

Example 4

In this Example, photoconductors 4A–4D were prepared in accordance with the general procedures as described above and including aluminum substrates treated in accordance with the present methods. Specifically, the aluminum substrates of photoconductors 4A–4D of this example were anodized and then contacted with an aqueous solution of about 0.7 weight percent pectin (polygalacturonic acid methyl ester), about 0.5 weight percent N-[3-triethoxy(silyl) propyl]-4,5-dihydroimidazole (TSPI) of the formula

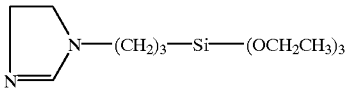

and about 0.05 weight percent HCl. In the resulting solution, hydrolysis of TSPI is catalyzed by the HCl to form a propylsilanol hydrolysate and an imidazoline compound. The hydrolysate contains Cl-substituted end groups. As a result of condensation reactions between the hydrolysate and hydroxyl groups of the pectin, as well as between the hydrolysate molecules themselves, a pectin polymer having pending polyorganosiloxane chains and approximate repeating units according to the following formula is formed:

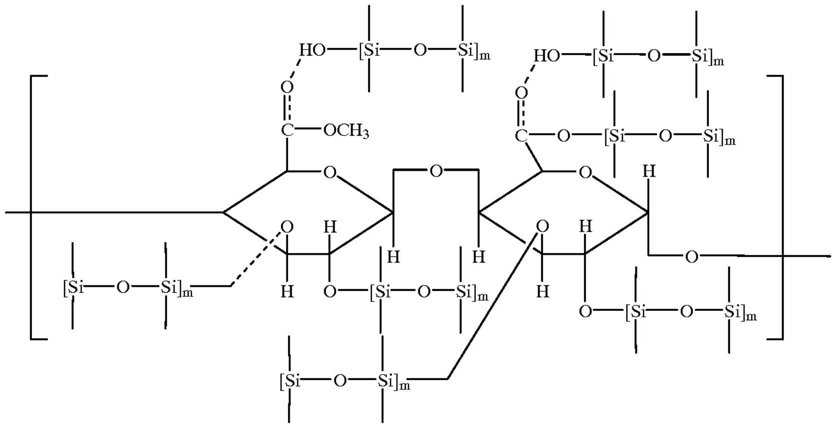

The anodized aluminum substrate was immersed in the described aqueous solution at room temperature for a period of about 30 seconds. Excess polymer was removed by rinsing with hot water at about 95° C. for about 2 minutes.

The photoconductors 4A–4D of this example and a control photoconductor 4E were subjected to adhesion measurement, residual voltage measurement, electrical sensitivity measurement and dark decay measurement in accordance with the general procedures set forth in Example 1, although the dark decay measurement used a higher initial voltage and therefore a higher field across the photoconductor and higher dark decay values resulted. The control photoconductor 4E was similar to photoconductors 4A–4D except that it comprised an anodized substrate having a combination of nickel acetate and water sealing. The results of these measurements are set forth in Table 7.

TABLE 7

| Photo-conductor | Polymer | Adhesion | Initial Charge Voltage (-V) | Residual Charge Voltage (-V) | Voltage at .237 $\mu$J/cm$^2$ (-V) | Dark Decay V/Sec (1 sec) |
|---|---|---|---|---|---|---|
| 4A | Pectin/TSPI | 0 | 701 | 41 | 171 | 65 |
| 4B | Pectin/TSPI | 0 | 700 | 45 | 171 | 53 |
| 4C | Pectin/TSPI | 0 | 695 | 42 | 167 | 63 |
| 4D | Pectin/TSPI | 0 | 703 | 44 | 172 | 55 |
| 4E | Control | 3 | 700 | 46 | — | 63 |

The results set forth in Table 7 demonstrate that the photoconductors including substrates prepared according to the present methods exhibited improved adhesion as compared with the control photoconductor and exhibited electrical properties equivalent to that of the control. The embodiment of this example is particularly advantageous in view of the short sealing time employed herein, approximately 30 seconds.

Example 5

In this example, photoconductors 5A–5D were prepared in accordance with the general procedures as described above and including aluminum substrates treated in accordance with the present methods. Specifically, the aluminum substrate of photoconductors 5A–5D of this example were anodized and then contacted with an aqueous solution of TSPI as the polymer-forming component. Hydrochloric acid (HCl) was also included in the aqueous solution in order to catalyze hydrolysis of the TSPI and initiate polymer formation. Thus, TSPI polymerized in situ to provide a polymer for sealing pores of the anodized aluminum substrate. The amount of TSPI and the seal time employed in the preparation of the respective substrates of the photoconductors of this Example are set forth in Table 8. A seal temperature of 24° C. was employed in the preparation of each substrate, followed by a two minute rinse using water at 95° C. The photoconductors 5A–5D and a control photoconductor 5E were subjected to measurement of adhesion, residual voltage and electrical sensitivity in accordance with the general procedures set forth in Example 1 and to measurement of dark decay in accordance with the general procedures set forth in Example 4. The control photoconductor 5E was similar to photoconductors 5A–5D except that it comprised an anodized substrate having a combination of nickel acetate and water sealing.

TABLE 8

| Photo-conductor | TSPI, wt % | Seal Time, min. | Adhesion Tape Test | Initial Charge Voltage (-V) | Residual Charge Voltage (-V) | Voltage at .237 μJ/cm² (-V) | Dark Decay, V/sec (1 sec) |
|---|---|---|---|---|---|---|---|
| 5A | 0.2 | 5 | 0 | 700 | 52 | 142 | 50 |
| 5B | 0.2 | 10 | 0 | 699 | 58 | 149 | 61 |
| 5C | 1.0 | 5 | 0 | 697 | 56 | 155 | 53 |
| 5D | 1.0 | 10 | 0 | 701 | 57 | 155 | 44 |
| 5E | Control | NA | 3 | 700 | 46 | — | 63 |

The results set forth in Table 8 demonstrate that the photoconductors 5A–5D according to the present invention exhibited significantly improved adhesion as compared with the control photoconductor 5E. Additionally, the photoconductors according to the present invention exhibited electrical properties equivalent to that of the control.

Example 6

In this example, photoconductors 6A–6D were prepared according to the present invention and including aluminum substrates sealed using aqueous solutions of polyethylene oxide, supplied commercially under the Tradename Polyox®. Specifically, the aluminum substrates of photoconductors 6A–6D of this example were anodized and then contacted with an aqueous solution of Polyox® WSRN-10 (having an approximate molecular weight of 100,000) or Polyox® WSRN-750 (having an approximate molecular weight of 300,000) as set forth in Table 9. In each sealing solution, the respective Polyox® component was employed in an amount of 1 weight percent. The aqueous sealing solutions of Polyox® were at about room temperature and the sealing step was conducted for about seven minutes. After immersion in the aqueous sealing solution, the substrates and photoconductors 6B and 6D were rinsed with water at about 95° C. for five minutes. The substrates and photoconductors 6A and 6C were not subjected to a rinsing step. The photoconductors 6A–6D of this example were subjected to measurement of adhesion and dark decay in accordance with the general procedures set forth in Examples 1 and 4, respectively, the results of which are set forth in Table 9. For comparison purposes, a control photoconductor 6E was also subjected to measurement of adhesion and dark decay, with the results set forth in Table 9. The control photoconductor 6E was similar to photoconductors 6A–6D except that it comprised an anodized substrate having a combination of nickel acetate and water sealing.

TABLE 9

| Photo-conductor | Polyox ® | Rinse Time, min | Adhesion Tape Test | Dark Decay V/sec (1 sec) |
|---|---|---|---|---|
| 6A | WSRN-10 | 0 | 0 | 82 |
| 6B | WSRN-10 | 5 | 5 | 76 |
| 6C | WSRN-750 | 0 | 0 | 79 |
| 6D | WSRN-750 | 5 | 5 | 79 |
| 6E | Control | NA | 3 | 91 |

The results set forth in Table 9 demonstrate that no rinse step is preferred with polyoxyethylene solution treatment and significant improvements in adhesion were obtained in photoconductors 6A and 6C, wherein a hot rinse step was not employed in the substrate treatment. Photoconductors 6A and 6C exhibited significant adhesion improvement as compared with the control photoconductor 6E. The photoconductors according to the present invention also exhibited dark decay equivalent to that of the control photoconductor 6E.

The preceding examples and specific embodiments disclosed herein are provided for illustrative purposes only. Additional embodiments and advantages of the present invention will be apparent to those skilled in the art and are within the scope of the present invention.

What is claimed is:

1. A conductive aluminum substrate, comprising an anodized surface layer of porous alumina and a polymer which seals pores of the alumina surface layer, the polymer comprising a pectin polymer.

2. A substrate according to claim 1, wherein the thickness of any coating of the polymer above the anodized surface layer is less than about 1 micron.

3. A substrate according to claim 1, wherein the polymer comprises a pectin polymer functionalized with a silicon-containing organic compound.

4. A photoconductor comprising a conductive aluminum substrate having an anodized surface layer of porous alumina and a sealing polymer which seals pores of the alumina surface layer, the sealing polymer comprising a phenoxy resin, an epoxy resin formed from epichlorohydrin and bisphenol A, or a pectin polymer, and a charge generation layer and a charge transport layer formed on the alumina surface layer, the charge generation layer comprising charge generation compound and a vinyl polymer or copolymer, wherein the charge transport layer is formed on the substrate and the charge generation layer is formed on the charge transport layer.

5. A photoconductor according to claim 4, wherein the vinyl polymer or copolymer is polyvinylchloride, polyvinylbutyral, polyvinylacetate, styrene polymer, or a copolymer thereof.

6. A photoconductor according to claim 4, wherein the vinyl polymer comprises polyvinylbutyral.

7. A photoconductor, comprising a conductive aluminum substrate having an anodized surface layer of porous alumina and a polymer which seals pores of the alumina surface layer, and a charge generation layer and a charge transport layer formed on the alumina surface layer, wherein the polymer comprises a pectin polymer.

8. A photoconductor according to claim 7, wherein the polymer comprises a pectin polymer functionalized with a silicon-containing organic compound.

* * * * *